(12) United States Patent
Sakthivel et al.

(10) Patent No.: US 11,733,022 B2
(45) Date of Patent: Aug. 22, 2023

(54) DETERMINING PART STRESS WITH IN SITU SENSORS

(71) Applicant: Baker Hughes Oilfield Operations LLC, Houston, TX (US)

(72) Inventors: Navin Sakthivel, Spring, TX (US); Aaron Avagliano, Tomball, TX (US); Wei Chen, Sugar Land, TX (US); Joshua Snitkoff, Houston, TX (US); Mikhail Nikolaevich Gladkikh, Conroe, TX (US); Amir Saeed, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/354,709

(22) Filed: Jun. 22, 2021

(65) Prior Publication Data
US 2022/0404134 A1    Dec. 22, 2022

(51) Int. Cl.
*G01B 7/16* (2006.01)
*B33Y 80/00* (2015.01)
*B33Y 10/00* (2015.01)

(52) U.S. Cl.
CPC ............ *G01B 7/16* (2013.01); *B33Y 10/00* (2014.12); *B33Y 80/00* (2014.12)

(58) Field of Classification Search
CPC ........... G01B 7/16; B33Y 10/00; B33Y 80/00
See application file for complete search history.

(56) References Cited

U.S. PATENT DOCUMENTS

| 7,360,437 | B2 | 4/2008 | Hardwicke et al. |
| 9,057,247 | B2 | 6/2015 | Kumar et al. |
| 9,207,154 | B2 | 12/2015 | Harding et al. |
| 9,410,868 | B2 | 8/2016 | Ward, Jr. et al. |
| 9,551,620 | B2 | 1/2017 | Singh et al. |
| 9,964,455 | B2 | 5/2018 | Cheverton et al. |
| 10,067,256 | B2 | 9/2018 | Turnbeaugh |
| 10,564,057 | B2 | 2/2020 | Janabi-Sharifi et al. |
| 2018/0307507 | A1* | 10/2018 | Kim ..................... G06F 1/1694 |
| 2019/0152137 | A1 | 5/2019 | Chaffins et al. |
| 2020/0393274 | A1* | 12/2020 | Dardona ............. G01M 5/0083 |

FOREIGN PATENT DOCUMENTS

WO    2020/191360 A1    9/2020

OTHER PUBLICATIONS

Donghuan Liu, Numerical Simulation of Creep Damage and Life Prediction of Superalloy Turbine Blade, Sep. 13, 2014, Hindawi Publishing Coporation, 10, vol. 2015.
Kris Ravi, Investigation of Additive Manufacturing of Components for the Oil & Gas Industry, Jun. 24, 2021, Digital Design and Manufacturing, 2.
M.F. Abdul Ghafir, Creep Life Prediction for Aero Gas Turbine Hot Section Component Using Artificial Neural Networks, Jun. 11, 2012, ASME Turbo Expo 2012, 11.

* cited by examiner

*Primary Examiner* — Rick K Chang

(74) *Attorney, Agent, or Firm* — TraskBritt

(57) ABSTRACT

A sensor system, including: a dielectric material on a part body; and a sensor on the dielectric material, the sensor configured to provide impedance, capacitance, and resistance values and to alter one or more of the impedance, capacitance and resistance values responsive to a stress applied to the part body. Also disclosed is a method of making and a method of using the sensor system.

20 Claims, 7 Drawing Sheets

DETERMINING PART STRESS WITH IN SITU SENSORS

TECHNICAL FIELD

Embodiments of the present disclosure relate generally to methods of monitoring equipment components for stress. The embodiments specifically relate to equipment for monitoring stress by measuring inductance, capacitance, and resistance values output by a sensor affixed to an equipment component under stress and calculating a stress and/or strain responsive to the measured inductance, capacitance, and resistance values. Other embodiments relate to monitoring stress responsive to imaging of physical changes in sensor elements of a sensor affixed to an equipment component.

BACKGROUND

Stress and strain are related by a stress-strain curve in materials. The stress-strain curve in metals may include an elastic region where strain is recoverable when the stress is removed and a plastic region where deformation is not recovered when the stress is removed. Stress-strain behavior varies based on composition and temperature of the material.

Monitoring the stress level in equipment using conventional techniques may be difficult and/or costly. Failure of equipment when stress exceeds safe levels can be expensive and/or hazardous. Accordingly, there is a need for effective monitoring of the stress in mechanical parts of complex systems.

BRIEF SUMMARY

This summary does not identify key features or essential features of the claimed subject matter, nor does it limit the scope of the claimed subject matter.

Accordingly, in some embodiments, a sensor system, including: a dielectric material on a part body; and a sensor on the dielectric material, the sensor configured to provide impedance, capacitance, and resistance values and to alter one or more of the impedance, capacitance and resistance values responsive to a stress applied to the part body.

Accordingly, in some embodiments, a method including: forming, by additive manufacture, a dielectric layer on a body of a part to be monitored for behavior responsive to applied stress; and forming, by additive manufacture, a conductive pattern on the dielectric layer, wherein, when interrogated, the conductive pattern is configured to provide an inductance value, a capacitance value, and a resistance value, the inductance, capacitance, and resistance values indicating a stress in the part.

Accordingly, in some embodiments, a method of measuring stress, including: measuring inductance, capacitance, and resistance between two sensor contacts on a part responsive to applied stress; converting the measured inductance, capacitance, and resistance to a stress parameter; and providing an indication of the stress parameter to a user.

BRIEF DESCRIPTION OF THE DRAWINGS

The illustrations presented in this disclosure are merely idealized representations employed to describe illustrative embodiments. Thus, the drawings are not necessarily to scale.

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Any headings used herein should not be considered to limit the scope of embodiments of the invention as defined by the claims below and their legal equivalents. Concepts described in any specific heading are generally applicable in other sections throughout the entire specification.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

As used herein, terms of relative positioning, such as "above," "over," "under," and the like, refer to the orientation and positioning shown in the figures. During real-world formation and use, the structures depicted may take on other orientations (e.g., may be inverted vertically, rotated about any axis, etc.). Accordingly, the descriptions of relative positioning must be reinterpreted in light of such differences in orientation (e.g., resulting in the positioning structures described as being located "above" other structures underneath or to the side of such other structures as a result of reorientation).

As used herein, the term "interrogate" means to provide a voltage to a sensor and measure inductance, resistance, and capacitance of the sensor. The voltage may be provided between contacts on the sensor. The voltage may be an alternating current (AC) or a direct current (DC). The voltage may comprise one or more pulses. The interrogation may include different AC magnitudes and frequencies.

Figure 1:
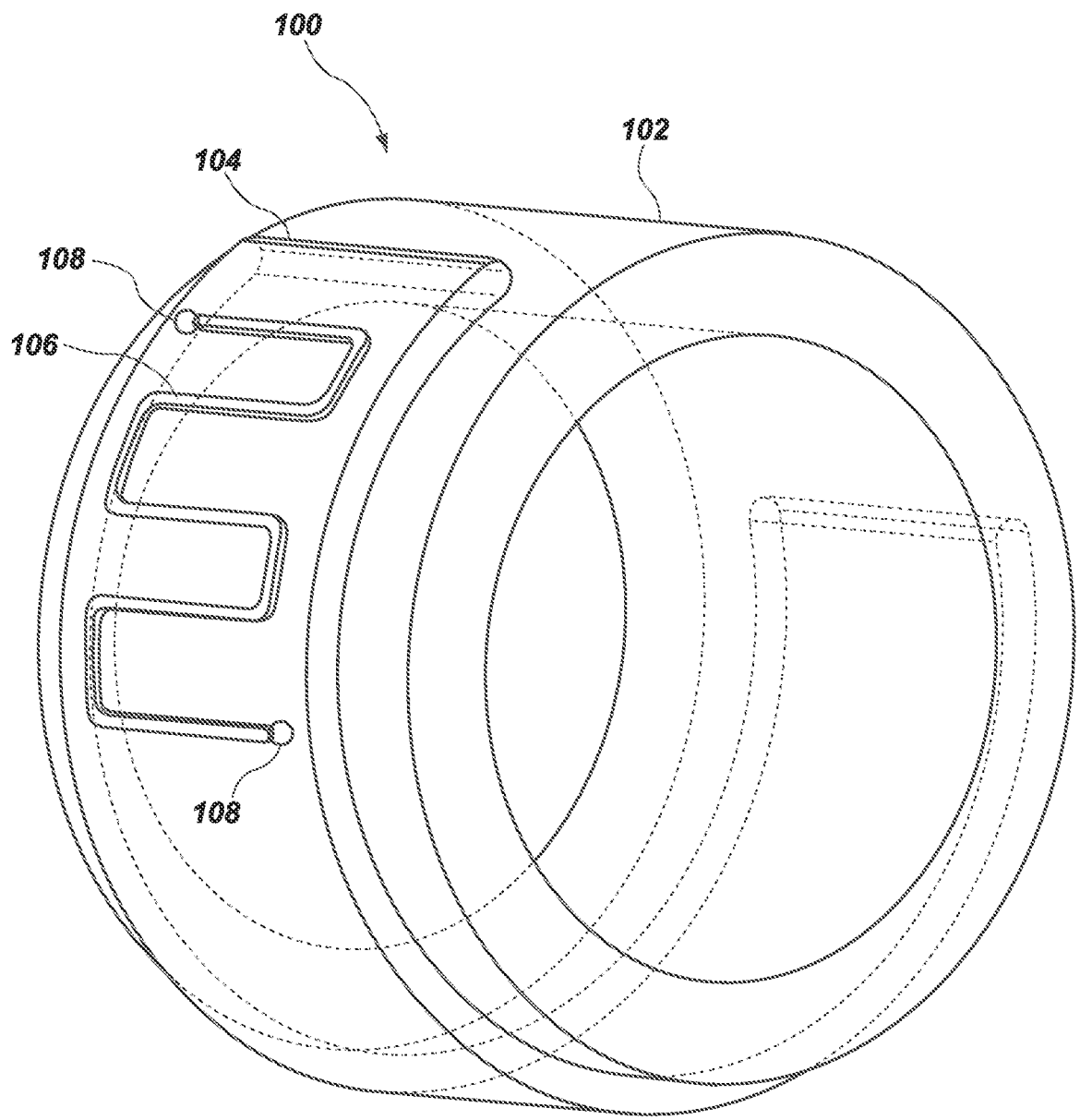
FIG. 1 is a perspective view of an embodiment of a sensor system consistent with this disclosure.

FIG. 1 is a perspective view of an embodiment of a sensor system consistent with this disclosure. A sensor system 100, including: a dielectric material 104 secured to a part body 102; and a sensor 106 secured to the dielectric material 104, the sensor 106 configured to provide inductance, capacitance, and resistance values when interrogated, and such outputs of the sensor 106 corresponding to a stress in the part body 102.

The sensor system 100 is a system for determining a stress in the part body 102. The sensor system 100 produces impedance, capacitance, and resistance values when interrogated. The output, i.e., the inductance, capacitance, and resistance values, of the sensor system 100 when interrogated correspond to a stress in the part body 102. The sensor system 100 includes a dielectric material 104 which separates the sensor 106 from the part body 102. The part body 102 may be conductive. Accordingly, having the sensor 106 directly on the part body 102 could result in shorting between the contacts 108 of the sensor 106. The dielectric material 104 between the sensor 106 and the part body 102 serves to insulate the sensor 106 from the part body 102.

The part body 102 may be composed of metal, polymer, ceramic, and/or another material. The part body 102 may be part of a larger assembly. The part body 102 may experience stress which is conveyed to the sensor 106. In some examples, the part body 102 expands or is otherwise distorted under stress, which induces strain in the dielectric material 104 and the sensor 106. The sensor 106 may detect this strain as shifts in the inductance, capacitance, and resistance values of the sensor 106. A relationship between the stress in the part body 102 and the change in inductance, capacitance, and resistance provides a means to calculate the stress in the part body 102 based on changes in the inductance, capacitance, and resistance values output by the sensor 106.

The part body 102 may be cylindrical in shape. The part body 102 may have an annular cross-section. The part body 102 may have a rectangular cross-section. The part body 102 may have another shape for a cross-section (e.g., octagonal, oval, etc.), including an irregular shape.

The part body 102 may be a component of a valve, a pipe, a drill pipe stand or tubing string section, a casing or liner, or an actuator. In an example, the part body 102 may be part of a downhole tool assembly. In such examples, the ability to cheaply and effectively monitor the stress the assembly has experienced can be used to make decisions about preventative maintenance, tool repair or tool or component replacement. Drill strings are typically very long (e.g., thousands of feet) and the cost of dealing with a failed downhole tool in terms of tripping the tool out of the wellbore, replacing it and running the drill string back to depth may be significant. The described sensor 106 allows condition monitoring on the part body 102 and thus on the associated tool. In other implementations of this embodiment, part body 102 may be configured as a turbine blade or other rotating turbine part such as bushings, shafts, slip rings, or flanges where condition monitoring during operation would be desirable to prevent catastrophic failure and indicate preventive maintenance. Currently, a lack of insights regarding stress distributions and specifically three dimensional stress distributions across given areas of segments of parts under operational loads impairs such prediction of failure or need for maintenance. Failure responsive to creep stress may be the most significant, if not the only cause of stress-induced failure of such rotating components.

As noted above, dielectric material 104 provides an electrical separation (e.g., insulation) between the part body 102 and the sensor 106. The dielectric material 104 may comprise a preformed, flexible layer applied to the part body 102, sent as a rigid block configured to conform to the part body 102, or a coating applied to the part body 102. The dielectric material 104 may be of non-uniform thickness on the part body 102. For example, the dielectric material 104 may be thicker in a first portion and thinner in a second portion. In other embodiments, the dielectric material 104 may be substantially uniform in thickness on the part body 102.

The dielectric material 104 may be a polymer. In some examples, the dielectric material 104 is a polyethylene (PE), polyethylene terephthalate (PET), polypropylene (PP), polystyrene (PS), polyester (PES), polyurethane (PU), polycarbonate (PC), polyetheretherketone (PEEK), and/or polyimide (PI). In some examples, the dielectric material 104 is a single material. In other examples, the dielectric material 104 includes multiple materials (e.g., multiple polymers).

In additional implementations, the dielectric material 104 may be a non-conductive ceramic, a glass or a paint.

The dielectric material 104 may comprise an adhesive, e.g., epoxy, cyanoacrylate (CA). The adhesive may be applied to the part body 102 to secure the sensor 106 to the part body 102. In some examples, an adhesive is applied over a dielectric material 104. The sensor system 100 may include a backing on the adhesive which supports the sensor 106. In some examples, the backing is shaped (e.g., curved) to match a profile of (i.e., conform to) the part body 102. The backing may be a polymer film, e.g., a flexible polymer film.

In an example, the dielectric material 104 may be adhered to the part body 102 and the sensor 106 adhered to the dielectric material 104. The dielectric material 104 may be a polymer which is melted (e.g., partially melted) to adhere to the part body 102. The dielectric material 104 may be melted as part of the additive manufacturing of the dielectric material 104. For example, the dielectric material 104 may be applied to the part body 102 as a powder and then subjected to heating to fuse the powder to the part body 102. In other examples, the part body 102 may be subjected to heating as the powder is applied. In some examples, the dielectric material 104 is applied with a three dimensional (3D) printer. For example, a 3D printer may be used to apply dielectric material 104 and then form a sensor 106 from an electrically conductive material on top of the dielectric material 104. In an example, the 3D printer is an aerosol jetting device. The aerosol jetting device may, in one embodiment, deposit a resistor, a capacitor, and/or an inductor as part of the sensor 106. In another embodiment, sensor element configurations for detection by imaging may be deposited. The aerosol jetting process may be used to 3D print the sensor features with desired size, shape and position, and may be used to 3D print the features on a curved part body 102.

The sensor 106 may be formed by other additive manufacturing techniques. In some examples, the sensor 106 is printed onto the dielectric material 104. The sensor 106 includes one or more conductive layers, e.g., metal layers. In some examples, the sensor 106 includes multiple metal layers partially separated by dielectric layers.

The sensor 106 may include a coil, or multiple coils, to generate inductance values by the sensor 106. The sensor 106 may include a serpentine conductive pattern. The sensor 106 may include a loop. The sensor 106 may include interdigitated serpentine patterns. The sensor 106 may include more complex shapes, e.g., three-dimensional shapes formed with multiple conductive layers and one or more dielectric layers.

In some examples, the sensor 106 shape is selected to identify the sensor 106 as well as provide the inductance, capacitance, and resistance of the sensor 106. In some examples, the resistance, capacitance, and/or inductance are used to identify the sensor as well as provide the stress information. For example, the resistance to capacitance ratio could be X for a first sensor, X+Y for a second sensor, etc.

The sensor 106 may include a metal such as aluminum, copper, silver, gold, platinum, tungsten, or zinc. In some examples, the metal may be silver or gold. In some examples, the sensor 106 is printed as a 3D printed object or objects onto the dielectric material 104. The 3D printed object or objects forming the sensor 106 may be formed from a metal-containing ink. For example, the ink may be a silver containing ink. The ink may contain nanoparticles such as, for example, zinc nanoparticles.

Figure 2:
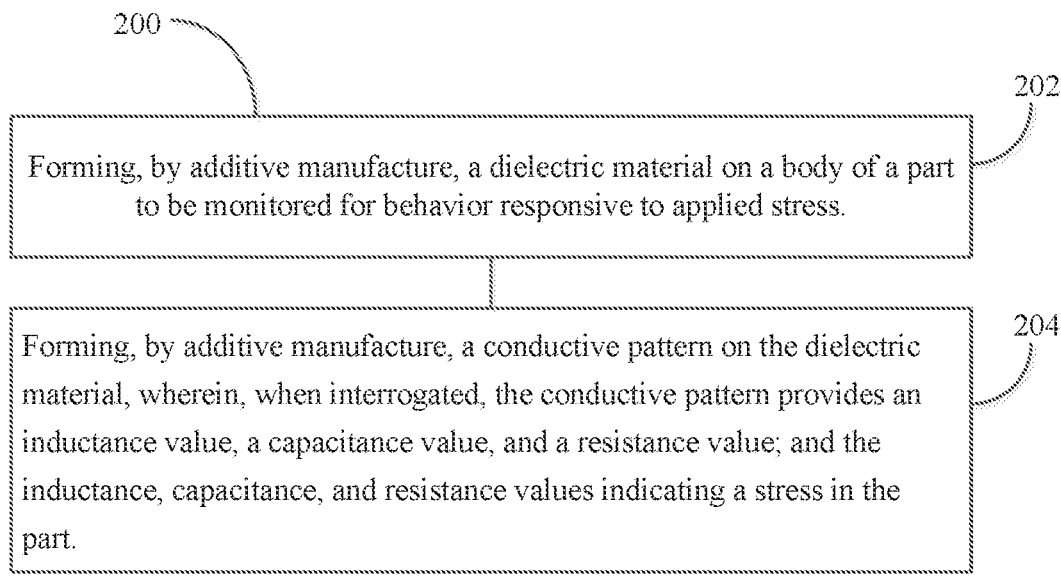
FIG. 2 depicts a flow diagram for a process of forming a sensor to monitor stress in a part in an example consistent with this disclosure.

FIG. 2 depicts a flow diagram for a process 200 of forming a sensor 106 to monitor stress in a part body 102 in an example consistent with this disclosure. The process includes forming, by additive manufacture, a dielectric layer on a body of a part to be monitored for behavior responsive to applied stress; and forming, by additive manufacture, a conductive pattern on the dielectric layer, wherein, when interrogated, the conductive pattern is configured to provide an inductance value, a capacitance value, and a resistance value, the inductance, capacitance, and resistance values indicating a stress in the part.

The process 200 includes the act 202 of forming, by additive manufacture, a dielectric layer on a body of a part to be monitored for behavior responsive to applied stress. The additive manufacture may be performed prior to the part being installed or after the part is installed in a larger assembly.

The process 200 includes the act 204 of forming, by additive manufacture, a conductive pattern on the dielectric layer, wherein, when interrogated, the conductive pattern is configured to provide an inductance value, a capacitance value, and a resistance value, the inductance, capacitance, and resistance values indicating a stress in the part.

As noted above, the conductive pattern may be multiple layers thick. For example, the conductive pattern may have multiple conductive layers in communication with each other and partially separated by another dielectric layer. The other dielectric layer may be formed from the same material as the dielectric layer (e.g., polyimide) or from a different material than the dielectric layer. In some examples, the other dielectric layer includes a feature to facilitate alignment of an interrogation apparatus with the sensor 106 to measure the resistance, impedance, and inductance of the sensor 106. The sensor 106 may include a bump, divot, trench, raised line, socket, and/or other mechanical feature to facilitate alignment with the sensor 106. In an example, the sensor 106 guides a tool (e.g., a probe) to alignment with the electrical contacts 108 of the sensor 106. The sensor 106 may have a corresponding feature in the tool, e.g., a bump and a divot to guide alignment.

Accordingly, in some embodiments, a method is described including: forming, by additive manufacture, a dielectric layer on a body of a part to be monitored; and forming, by additive manufacture, a conductive pattern on the dielectric layer, wherein, when interrogated, the conductive pattern provides an inductance, a capacitance, and a resistance; and the inductance, capacitance, and resistance indicate a stress in the part.

Figure 3:
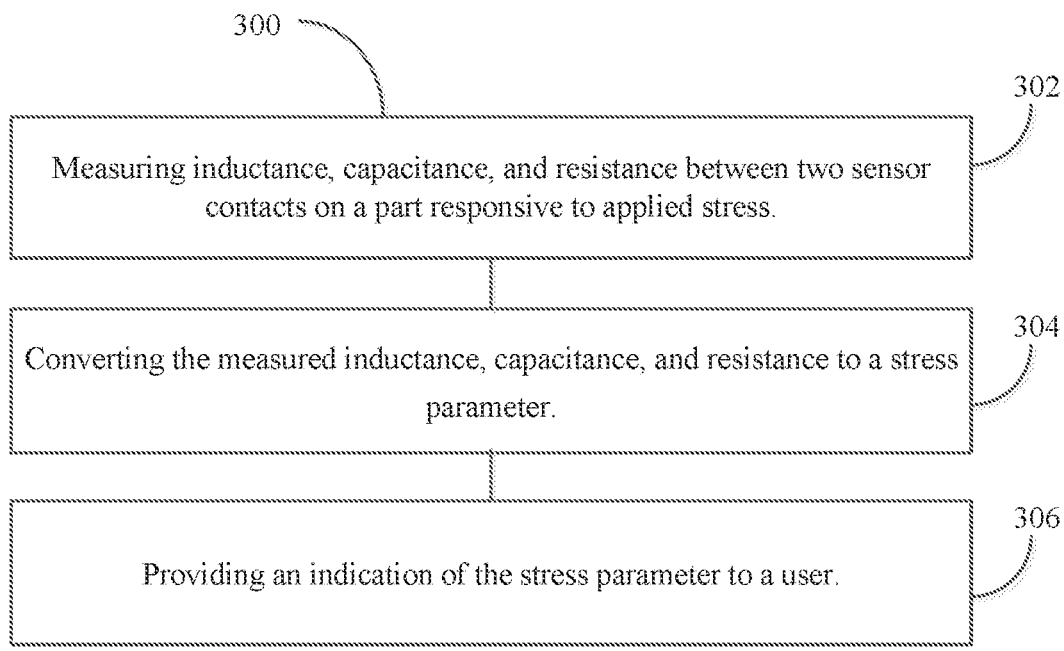
FIG. 3 depicts a flow diagram for a process of using a sensor to monitor stress in a part in an example consistent with this disclosure.

FIG. 3 depicts a flowchart of a method 300 of measuring stress. The method 300 including: measuring 302 inductance, capacitance, and resistance values between two sensor contacts 108 of a sensor on a part responsive to applied stress; converting 304 the measured inductance, capacitance, and resistance to a stress parameter; and providing 306 an indication of the stress parameter to a user.

In some embodiments, the dielectric material 104 may cover the sensor 106 except for some exposed electrical contacts 108, and be configured to protect the sensor 106 from mechanical damage.

In some examples, the stress on the part body 102 is transient, but is captured in and exhibited by permanent change of the sensor 106. When the stress is released, the permanent change of the sensor 106 continues to store a signal level of the peak stress experienced by the sensor 106 and may be detected by the sensor 106. This may allow the sensor 106 to report a stress value even when the stress has been removed from the part. This may be true even after the part body 102 has relaxed and recovered elastically from the stress.

The method 300 includes measuring 302 inductance, capacitance, and resistance between at least two sensor contacts 108 on a part responsive to applied stress. The inductance, capacitance, and resistance may be measured between three or more contacts 108. In some examples, the method may include measuring the inductance, capacitance, and resistance multiple times (e.g., two times, three or more times). The inductance may be a mean inductance obtained from multiple measurements. Similarly, the capacitance and resistance may be mean values based on multiple measurements. In other examples, each measurement is converted to a stress value which is compared with a predetermined threshold. A pass or fail signal may be given for each measurement based on comparison of a calculated stress value with the threshold value.

The method 300 includes converting 304 the measured inductance, capacitance, and resistance values to a stress parameter. In some examples, the system 100 consults a look up table to determine the stress. In some examples, the system 100 calculates the stress using a mathematical formula. In some examples, the system 100 interpolates the stress from a calibration curve. In some examples, the system 100 consults a machine learning system trained on a calibration set to determine the stress. The machine learning system may be configured to determine stress from the measured values of inductance, capacitance, and resistance. In some examples, a calibration curve is prepared which correlates stress with inductance, capacitance, and resistance. The strain may be determined based on the sensor 106 output of these values. This may be combined with information regarding the material of the part body 102 to determine the stress in the part body 102. The calibration curve may be developed by attaching a known material (i.e., a material of the part body 102) to a sensor 106 and testing the material and sensor 106 on a tensile test machine. In one example, the known material is in the shape of a tensile test sample (e.g., a dog bone-shaped part). In other examples, a test sample substantially identical to part body 102 and bearing an identical sensor 106 is subjected to various types, levels and directions of stress and output values of inductance, capacitance and resistance from identical sensor 106 are captured and stored in computer memory. A virtual simulation of a test sample configured as part body 102 and bearing a simulated sensor 106 may also be employed in a mathematically simulated stress test sequence identical to the physical stress test of the test sample, and the results compared to derive the calibration curve.

In an example, the inductance, capacitance, and resistance values may indicate strain in different axes. For example, the inductance may indicate strain in an X direction and the capacitance may indicate strain in a Y direction perpendicular to the X direction (see FIG. 1). In other examples, the inductance value may indicate strain in X and Y directions, while the resistance value indicates strain in the X direction. The sensor 106 may include an inductor, e.g., a coil, which is sensitive to expansion in X and Y directions. The sensor 106 may include a capacitor which may be stretched along a first axis, resulting in a change in capacitance. In an example, the capacitor may include a pair of conductors separated by an air gap. The sensor 106 may include multiple capacitors oriented in different orientations to provide detection of strain in a variety of directions. In some examples, the sensor 106 includes an interleaved capacitor.

In an example, the inductance, capacitance, and resistance values indicate strain in the same axis. The values may be combined to provide a more reliable estimate of the strain and, thus the stress on the part body 102. In an example, the inductance is converted to a strain along a first axis, the capacitance is converted to a strain along the first axis, and the resistance is converted to a strain along the first axis. Then the three stress measurements are averaged to determine a mean strain or a median strain. The inductance, capacitance, and resistance values indicating may then be converted to stress based on a stress-strain relationship (e.g., a stress-strain curve).

The method 300 includes providing 306 an indication of the stress parameter to a user. In some examples, the stress is compared with a threshold. If the stress level is below the threshold, the system may produce an audible pass sound. If the stress level is above the threshold, the system may produce an audible fail sound. These pass and fail sounds may allow rapid determination of pass or fail compared without consulting a display value. In some examples, the system may be connected to a display device for displaying a stress result. This may be a pass or fail symbol depending on comparing the stress value with a threshold value. The result on the display may be a numeric value (e.g., a measurement) for the stress. In some examples, a numeric value is displayed with a color indicating a status, e.g., green for pass and red for fail.

Accordingly, in some embodiments, a method of measuring stress, including: measuring inductance, capacitance, and resistance between two contacts 108 on a part; converting the measured inductance, capacitance, and resistance to a stress; and providing an indication of the stress to a user.

Figure 4:
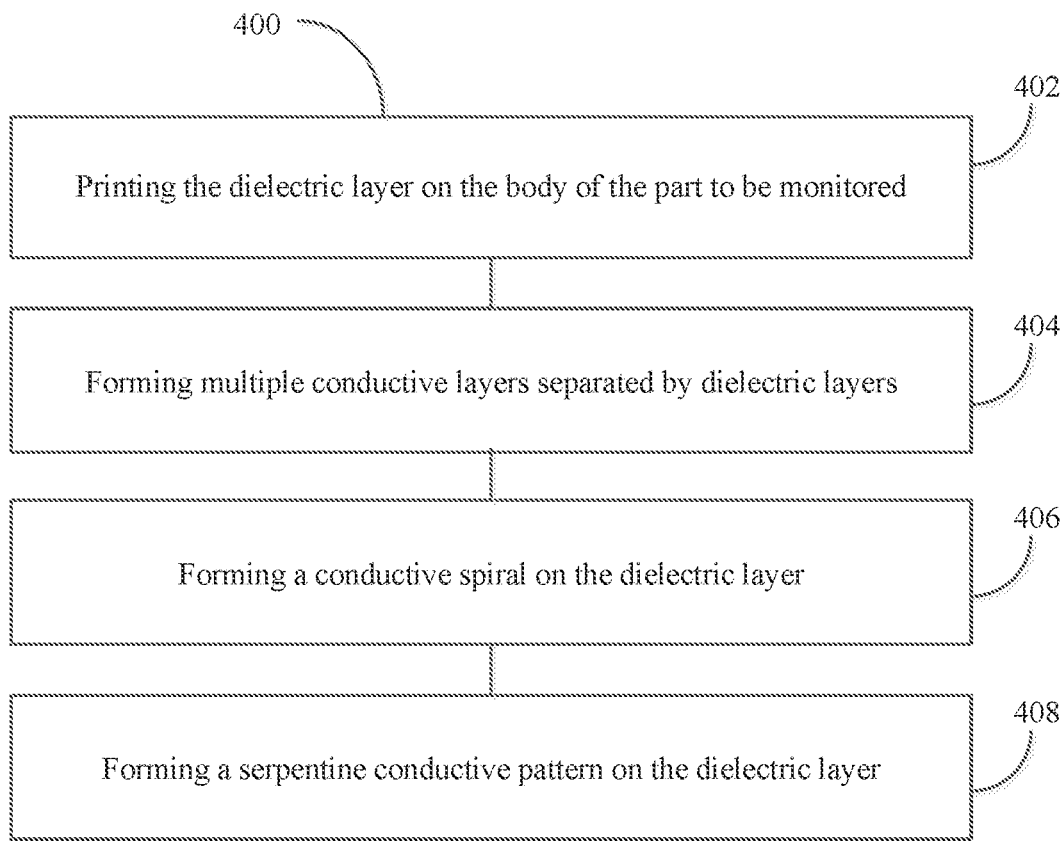
FIG. 4 depicts a flow diagram for a process of forming a sensor to monitor stress in a part in an example consistent with this disclosure.

FIG. 4 depicts a flow diagram for a process 400 of forming a sensor 106 to monitor stress in a part in an example consistent with this disclosure.

The process 400 includes the act 402 of printing the dielectric layer 104 on the body of the part 102 to be monitored prior to printing the sensor 106 on the dielectric layer 104.

The process 400 includes the act 404 of forming multiple conductive layers separated by dielectric layers. The multiple conductive layers make up the sensor 106. The multiple conductive layers may include inductors, capacitors, and traces. In some examples, different conductive layers are designed to detect strain in different axes. For example, one layer may detect stress in an X direction while another layer separated by dielectric material may detect stress in a Y direction perpendicular to the X direction. In some examples, sensor element patterns may overlap one another in X and/or Y while being separated from each other in Z (thickness). In some embodiments, different sensor elements (i.e., inductor, capacitor, resistor) may be located to indicate different strain parameters (i.e., inductance, capacitance, resistance) in the same direction.

The process 400 includes the act 406 of forming a conductive spiral on the dielectric layer. The conductive spiral may provide for enhanced inductance of the sensor 106. The conductive spiral may be limited to a single layer of the sensor 106. In some examples, the conductive spiral includes a ferrite or similar material located in the conductive spiral. In some examples, the ferrite is printed using the additive manufacturing system used to deposit the conductive spiral.

The process 400 includes the act 408 of forming a serpentine conductive pattern on the dielectric layer to facilitate detection of strain by changes in resistance of the sensor 106. The serpentine pattern may have a principle axis aligned with the length of the serpentine pattern such that strain in the principle axis is detected by resistance value changes and strain along other axes is not detected.

Figure 5:
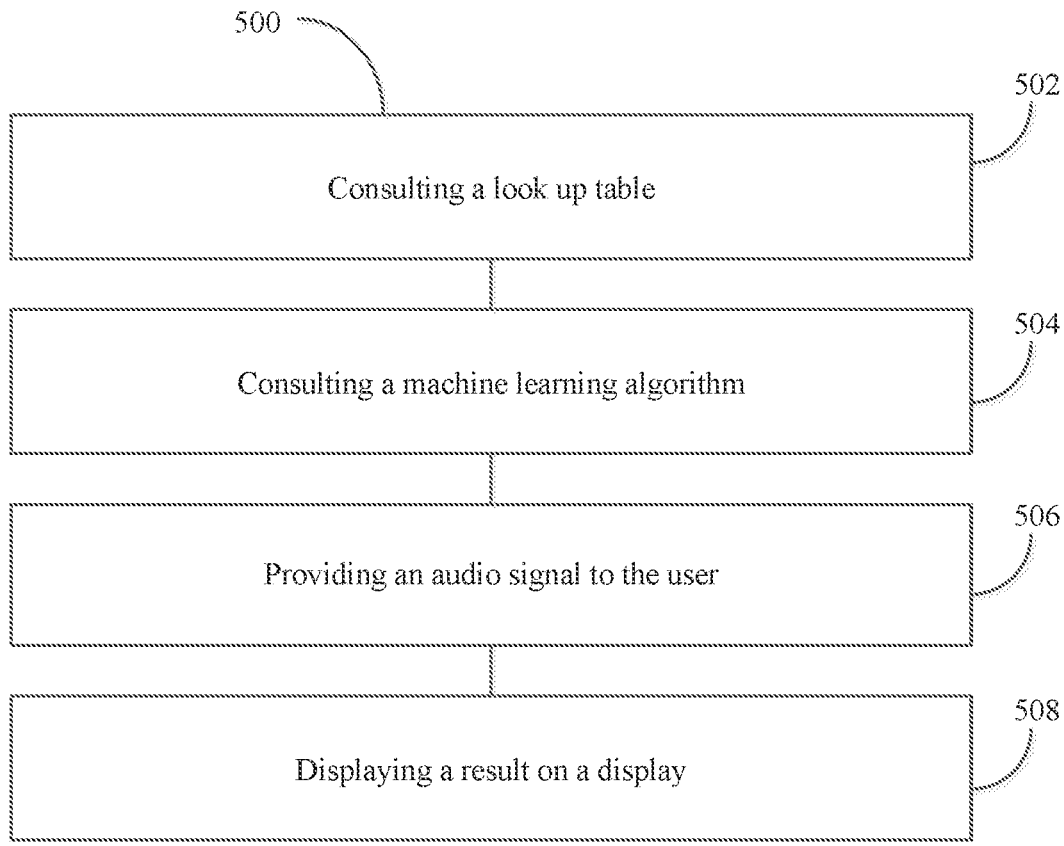
FIG. 5 depicts a flow diagram for a process of using a sensor to monitor stress in a part in an example consistent with this disclosure.

FIG. 5 depicts a flow diagram for a process 500 of using a sensor 106 to monitor stress in a part in an example consistent with this disclosure. The described acts may be performed in any order. Optionally, some of the acts may be performed alone or in combination with each other.

The process 500 includes the act 502 of consulting a look up table. The look up table may provide stress values in response to the sensor 106 outputs of inductance, capacitance and resistance values. The look up table may be calculated from one or more calibration curves. In an example, the calibration curves provide the stress values for a variety of inductance, capacitance, and resistance value outputs of the sensor 106. The calibration curves may be interpolated to provide for intermediate values of the sensor 106. The calibration curves may be interpolated to populate the look up table. The look up table may be populated by a machine learning algorithm.

The process 500 includes the act 504 of consulting a machine learning algorithm to learn and map stresses and observed changes in inductance, capacitance and resistance of the sensor 106 under stress. The machine learning algorithm may be a deep learning model. The machine learning algorithm may be trained and validated on a training set including calibration curves developed based on electromechanics first principles. The experimental phase is repeated for various different input alternating current (AC) signals to optimize the sensing architecture for deployment for real-time monitory of the part body 102 during operation. The machine learning algorithm receives inductance, capacitance, and resistance values as input and provides a stress in the part as an output. In an example, the machine learning algorithm may be a recurrent neural network (RNN), a long short-term memory network (LSTM), multilayer perceptron (MLP), stacked auto-encoders, etc.

The process 500 includes the act 506 of providing an audio signal to the user. The audio signal may indicate whether the stress in the part is above or below a threshold value. For example, the sensor 106 reports an inductance, a capacitance, and a resistance value. The values of the reported inductance, capacitance, and resistance are provided to a machine learning system which reports a stress in the part. The system then compares the reported stress in the part with a threshold value and produces a pass sounds if the stress in the part is below the threshold and produces a fail sound if the stress in the part is above or equal to the threshold.

The process 500 includes the act 508 of displaying a result on a display. The display may show a value for the stress in the part. The display may show a pass or fail symbol depending on the comparison of the determined stress and a threshold value. In an example, the display shows a calculated stress value based on strain indicated by the inductance, capacitance, and resistance output of the sensor 106.

Figure 6:
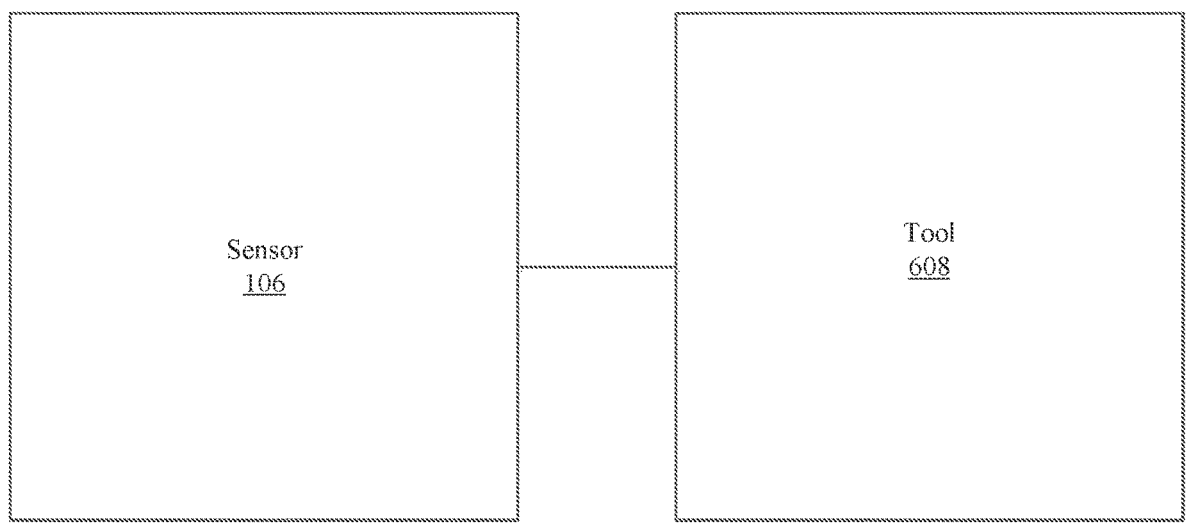
FIG. 6 depicts a block diagram of a sensor and a tool in an example consistent with this disclosure.

FIG. 6 shows a block diagram of the sensor 106 in use. The block diagram includes the sensor 106 in the first block. In a second block is a tool 608, which may include a power supply, processor and memory for interrogating the sensor 106. The tool 608, when connected to the sensor 106, provides a potential across the contacts 108 of the sensor 106. The tool 608 reads inductance, resistance, and capacitance values from the sensor 106 responsive to the interrogation. In an example, the tool 608 reads an impedance and phase angle and calculates an inductance, resistance, and capacitance. The tool 608 may then perform calculation of the stress and/or strain in the part body 102 based on an output of the sensor 106. The tool 608 may then report the stress and/or strain to a user. In an example, the tool 608 includes a multimeter to determine the inductance, capacitance, and resistance between two contacts 108 of the sensor 106. The tool 608 may include an LCR meter and/or an oscilloscope to determine the inductance, capacitance, and resistance between the two contacts 108 of the sensor 106. The tool 608 may include a probe to interact with the sensor 106. The probe may include a tip which fits with the contacts 108 of the sensor 106. In some examples, the probe may be flexibly connected to the tool 608 so as to facilitate placement on the sensor 106. The tool 608 may be hand held or attached to a belt. In some embodiments, tool 608 may include a camera to allow for visual assessment of sensor element shapes of the sensor 106 as described below.

Figure 7:
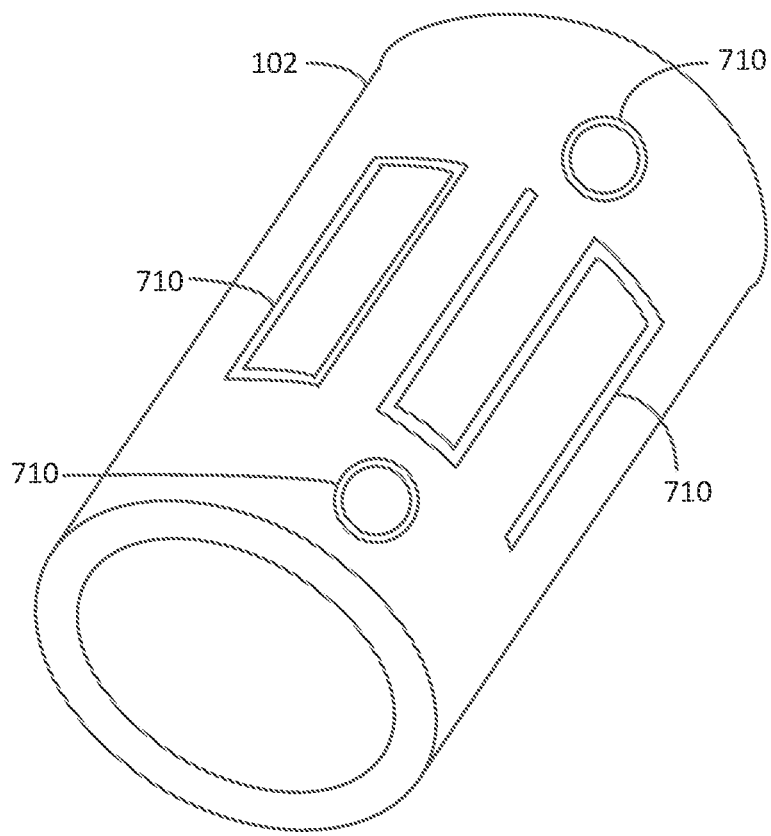
FIG. 7 depicts a perspective view of an embodiment of a system consistent with this disclosure.

FIG. 7 shows an example of shapes 710 of another embodiment of sensor 106 which may be formed directly on the part body 102. In FIG. 7, the shapes 710 include two circles, a rectangle, and a serpentine design. In an example, the shapes 710 may include circles, triangles, squares, rectangles, dots, loops, and/or serpentine designs. In some examples, the shapes 710 are regularly positioned on the part body 102. For example, there may be an array of dots of increasing size. The shapes 710 may be organized with respect to an origin on the part body 102. The shapes 710 may be formed on the part body by additive manufacture, e.g., by aerosol jetting. The shapes 710 may be formed of a metal, for example, copper on the part body 102. In an example, the material used to form the shapes 710 is softer (e.g., less hard) than the part body 102 on which the shapes 710 are formed. The shapes 710 may become mechanically distorted by exposure of the part body 102 to stress, resulting in strain of the part body 102 captured by distortion of one or more shapes. The distortion of the shapes 710 may then be used to determine the stress applied to the part body 102. The use of shapes 710 enables condition monitoring and preventative maintenance, provides a low cost, passive sensing architecture, and may provide feedback on stress distributions for design improvement. In such an embodiment, axial, torsional, creep and fatigue stresses on the part body 102 may be determined in three dimensions.

In some examples, the strain on the part body 102 bearing shapes 710 is simulated physically to determine the changes in the shapes 710 and/or sensor 106 on the part body 102. The shapes 710 may be printed on a test sample part body 102 substantially identical to a part body 102 to be included in a larger assembly, for example a downhole tool, which test sample is then physically tested for different conditions of loading to stress the test sample. Images may be captured with an image recognition system (e.g., camera operably coupled to computer memory and processor) of distortion of the tested shapes 710 on the test sample as subjected to various levels, types and directions of stress. It is contemplated that the levels, types and directions of applied stress are selected to correspond to those most likely to cause failure of the part body 102 in actual operation of the larger assembly. These images may be used by the processor of the image recognition system to derive a calibration curve for the relationship between stress and the changes to the shapes 710 of sensor 106 on the part body 102. It is contemplated that a virtual simulation of the geometry of part body 102 bearing shapes 710 of sensor 106 may also be employed, and results compared to the physical simulation to develop the calibration curve.

An algorithm of a machine learning system in conjunction with calibration curve derivation may be used to develop a transfer function relationship between strain or deformation of the shapes 710 in the images and the stress applied to the test sample part body 102. The inputs to the machine learning system may include the stress levels and associated images. The machine learning system may be a deep learning system. In some examples, the machine learning system is a recurrent neural network (RNN), a multilayer perceptron (MLP) system, a long short term memory (LSTM) system, or stacked autoencoders. The transfer function relationship may be used to map the distortion in the shapes 710 on the part body 102 to stresses on the test sample part body 102 and the observed strain state. This may be used to calculate the stress of the actual part body 102 to be used.

In an example, a user takes an image of the actual part body 102 after it has been in use, for example in a downhole tool assembly. The image is provided to the machine learning system which analyzes the distortion in the printed features on the surface of the actual part body 102 and determines a stress level in the part body 102 based on the condition and configuration of the shapes 710 in an image of the surface of the actual part body 102 based on the information provided by condition and configuration of shapes 710 under various applied stress to the test sample part body and, optionally, a virtual simulation thereof. In an example, the shapes 710 on the actual part body 102 may, via the machine learning system, convey information on one or more of axial stress, torsional stress, creep stress and fatigue stress in a three dimensional fashion.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A sensor system, comprising:
a dielectric material on a part body; and
a sensor on the dielectric material, the sensor comprising a plurality of conductive layers and configured to provide inductance, capacitance, and resistance values, wherein each conductive layer of the plurality of conductive layers is configured to alter one or more of the inductance, capacitance and resistance values responsive to a stress applied along a corresponding axis of the part body,
wherein at least one corresponding axis of the part body is different than at least one other corresponding axis of the part body.

2. The sensor system of claim 1, wherein the plurality of conducive layers are at least partially separated from each other by one or more additional dielectric layers.

3. The sensor system of claim 1, wherein the dielectric material comprises polyimide.

4. The sensor system of claim 1, wherein the sensor comprises a metal comprising one or more of aluminum, copper, silver, gold, platinum, tungsten, or zinc.

5. The sensor system of claim 1, wherein the sensor comprises a coil.

6. The sensor system of claim 1, wherein the sensor has a serpentine shape.

7. The sensor system of claim 1, wherein the part body is cylindrical.

8. The sensor system of claim 1, wherein the part body is a component of a valve, a pipe, a drill pipe stand or tubing string section, a casing or liner, an actuator, a downhole tool, a turbine blade or other rotating turbine part including a bushing, a shaft, a slip ring, or a flange.

9. A method comprising:
forming, by additive manufacture, a dielectric layer on a body of a part to be monitored for behavior responsive to applied stress; and
forming, by additive manufacture, a sensor comprising a conductive pattern comprising a plurality of conductive layers on the dielectric layer, wherein, when interrogated, each conductive layer of the plurality of conductive layers of the conductive pattern is configured to provide an inductance value, a capacitance value, and a resistance value, the inductance, capacitance, and resistance values indicating a stress along a corresponding axis of the part,
wherein each conducive layer of the plurality of conductive layers is configured to alter one or more of the inductance value, the capacitance value, and the resistance value responsive to the stress applied along a corresponding axis of the part,
wherein at least one corresponding axis of the part is different than at least one other corresponding axis of the part.

10. The method of claim 9, wherein forming a dielectric layer on a body of a part to be monitored for behavior responsive to applied stress comprises printing the dielectric layer on the body of the part to be monitored.

11. The method of claim 9, wherein forming a sensor comprising a conductive pattern comprising a plurality of conductive layers on the dielectric layer comprises forming the plurality of conductive layers separated by additional dielectric layers.

12. The method of claim 9, wherein forming a conductive pattern on the dielectric layer comprises forming a conductive spiral on the dielectric layer.

13. The method of claim 9, wherein forming a conductive pattern on the dielectric layer comprises forming a serpentine conductive pattern on the dielectric layer.

14. The method of claim 9, wherein the dielectric layer comprises polyimide and the conductive pattern comprises a metal selected from a group consisting of silver and gold.

15. A method of measuring stress, comprising:
providing a sensor system, the sensor system comprising:
a dielectric material on a part body; and
a sensor on the dielectric material, the sensor comprising a plurality of conductive layers and configured to provide inductance, capacitance, and resistance values, wherein each conductive layer of the plurality of conductive layers is configured to alter one or more of the inductance, capacitance, and resistance values responsive to a stress applied along a corresponding axis of the part body,
wherein at least one corresponding axis of the part body is different than at least one other corresponding axis of the part body,
measuring inductance, capacitance, and resistance between at least two sensor contacts of the sensor on the part body responsive to the stress applied to the part body;
converting the measured inductance, capacitance, and resistance to a stress parameter; and
providing an indication of the stress parameter to a user.

16. The method of claim 15, wherein providing an indication of the stress parameter to a user comprises providing an audio signal to the user.

17. The method of claim 15, wherein providing an indication of the stress parameter to a user comprises displaying a result on a display.

18. The method of claim 15, wherein the two sensor contacts are separated from the part by the dielectric material.

19. The method of claim 15, wherein converting the measured inductance, capacitance, and resistances to a stress parameter comprises consulting a look up table.

20. The method of claim 15, wherein converting the measured inductance, capacitance, and resistance to a stress parameter comprises consulting a machine learning algorithm.

* * * * *

UNITED STATES PATENT AND TRADEMARK OFFICE
CERTIFICATE OF CORRECTION

| | | |
|---|---|---|
| PATENT NO. | : 11,733,022 B2 | Page 1 of 1 |
| APPLICATION NO. | : 17/354709 | |
| DATED | : August 22, 2023 | |
| INVENTOR(S) | : Navin Sakthivel et al. | |

It is certified that error appears in the above-identified patent and that said Letters Patent is hereby corrected as shown below:

In the Claims

| | | | |
|---|---|---|---|
| Claim 2, | Column 11, | Line 2, | change "conducive layers" to --conductive layers-- |
| Claim 9, | Column 11, | Line 33, | change "conducive layer" to --conductive layer-- |
| Claim 15, | Column 12, | Line 24, | change "the part body," to --the part body;-- |

Signed and Sealed this
Twenty-third Day of April, 2024

*Katherine Kelly Vidal*

Katherine Kelly Vidal
*Director of the United States Patent and Trademark Office*